Patented Dec. 29, 1936

2,066,044

UNITED STATES PATENT OFFICE 2,066,044

LUMINESCENT MATERIAL

Humboldt W. Leverenz, Collingswood, N. J., assignor to Radio Corporation of America, New York, N. Y., a corporation of Delaware No Drawing. Application August 30, 1932, Serial No. 631,027

8 Claims. (Cl. 250—34)

My invention relates to improvements in luminescent materials.

One of the objects of my invention is to provide a material adaptable particularly for the so-called fluorescent screens for cathode ray tubes used in television receivers, and on which an image of the transmitted object is reproduced, the material having advantages over those proposed heretofore in the way of increased intensity, efficiency and stability.

Other objects and advantages will hereinafter appear.

My improved material comprises a metallic orthogermanate activated by a metal which gives to the material the characteristic of becoming luminescent upon excitation thereof by radiant energy, alpha-particle bombardment, or cathode-ray bombardment.

In making my improved material, for example, a bimolecular weight of zinc oxide, in powder form, is mixed in a platinum crucible with a unimolecular weight of germanium dioxide, also in powder form. Manganese chloride is then added to the mixture by dissolving some of this salt in water and pouring the salt solution over the mixture of the two powders. The amount of manganese chloride may vary from one ten-thousandth of one percent to one percent of the combined weights of the two powders.

The mixture is then fritted at a temperature whereat the same becomes semi-fluid. Satisfactory results have been obtained by heating the mixture of powders, during this step, to a temperature of approximately 1000 degrees centigrade.

A white powder results, of material which is macroscopically homogeneous. That is, in any single particle of this material, the respective constituents thereof bear the same relation to each other as to quantity and relative positions in the particle. Strictly speaking, the material is neither heterogeneous nor homogeneous.

My improved material may be said to comprise a metallic orthogermanate activated by a metal which gives to the material the characteristic of becoming luminescent upon being excited. The term "excited", where used alone hereinafter, is to be construed as meaning the condition assumed by the material when exposed to electron bombardment, X-ray, or actinic light.

It is proposed to use zinc oxide or magnesium oxide. If zinc oxide is used, the resulting zinc-orthogermanate is bright green-yellow under both ultra-violet and cathode ray excitation, and the light given off therefrom is of equal or better intensity than from any of the various materials proposed heretofore.

The formation of the zinc-orthogermanate may be expressed as follows:

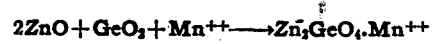

If magnesium oxide is used, the resulting magnesium-orthogermanate is orange or scarlet-red under both ultra-violet and cathode ray excitation.

The formation of the magnesium-orthogermanate may be expressed as follows:

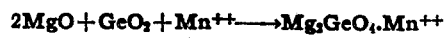

Each material has a relatively long period of phosphorescence and gives a very instense light. They have been found to be much more stable than the common sulphides proposed heretofore.

In lieu of manganese chloride, any of the other manganese halides may be used. Manganese dioxide may also be used instead of one of the manganese halides.

For the purpose of obtaining greater brilliancy as the screen, made of my improved material, is scanned by a cathode ray, it is proposed, in the making of the screen, to mix in with the various ingredients from one percent to ten percent of an element or elements which yield X-rays under cathode ray bombardment. Elements for this purpose may be molybdenum, tungsten, thallium, tin, platinum, etc., or compounds of these elements. The X-rays, having greater penetrating power than the cathode rays, are effective to excite the particles below the surface of the screen, and, also, penetrate further into the individual particles or crystals than the cathode rays. With the addition of an element of the character referred to, therefore, the screen has greater brilliancy than would otherwise be the case, under the same operating conditions.

For the purpose of obtaining a greater degree of secondary emission, it is also proposed to add to the ingredients, in making my improved material for the screen of a cathode ray tube, a radio-active material such as radium, mesothorium, actinium, or their compounds. The amount of this material added may be from one ten-thousandth of one percent to one percent, as might be required.

The various weights and temperatures given above are not critical in any strict sense of the word, and may be varied over a wide range.

While my improved material is particularly effective for the screens of cathode ray tubes in television receivers, it is proposed to apply a radio-active luminescent material in sufficient amount and use this combination for making the so-called radium watch dials. It is also of value for making fluorescent screens of the type used in connection with X-rays.

My improved material may also find application in the art of photography, and in producing theatrical effects when excited by radiant energy. The material may also find application to instrument boards and the like for producing desired luminescent effects.

I claim as my invention:

1. A metallic orthogermanate activated by a metal which gives to the combination the characteristic of becoming luminescent upon excitation thereof.

2. A macroscopically homogeneous material comprising a metallic activated magnesium orthogermanate and characterized by the fact that it becomes luminescent upon being excited.

3. A macroscopically homogeneous material comprising zinc orthogermanate and a metal other than zinc, said material being characterized by the fact that it becomes luminescent upon being excited.

4. Screen material for a cathode ray tube comprising a metallic orthogermanate and a radioactive material.

5. A new composition of matter, suitable for use as an element of a fluorescent screen, said composition comprising zinc oxide, germanium dioxide, and manganese compound said composition being spectrally stable.

6. The invention set forth in claim 5 characterized in that the material contains zinc oxide and germanium dioxide in the relation of a bimolecular weight of the zinc oxide to a unimolecular weight of the germanium dioxide are employed.

7. The invention set forth in claim 5 characterized in that the material contains manganese compound to the extent of from 1/10,000 percent to 1 percent of the manganese compound to the combined weights of the other two ingredients.

8. A new composition of matter, suitable for use as an element of a fluorescent screen, said composition comprising magnesium oxide, germanium dioxide, and a manganese compound said composition being spectrally stable.

HUMBOLDT W. LEVERENZ.